United States Patent
Weber et al.

(10) Patent No.: US 12,397,654 B2
(45) Date of Patent: Aug. 26, 2025

(54) COMPONENT ARRANGEMENT FOR AN ELECTRICAL HIGH-VOLTAGE ON-BOARD POWER SUPPLY OF A VEHICLE

(71) Applicant: Mercedes-Benz Group AG, Stuttgart (DE)

(72) Inventors: Thomas Weber, Herrenberg (DE); Markus Orner, Rennigen (DE); Nathan Troester, Stuttgart (DE); Andreas Kruspel, Leinfelden-Echterdingen (DE); Matthias Leinfelder, Tuebingen (DE); Keith Ren Qiang Ong, Boeblingen (DE); Urs Boehme, Ehningen (DE); Akin Candir, Filderstadt (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/708,379

(22) PCT Filed: Nov. 7, 2022

(86) PCT No.: PCT/EP2022/081027
§ 371 (c)(1),
(2) Date: May 8, 2024

(87) PCT Pub. No.: WO2023/083765
PCT Pub. Date: May 19, 2023

(65) Prior Publication Data
US 2025/0010725 A1    Jan. 9, 2025

(30) Foreign Application Priority Data
Nov. 9, 2021 (DE) ............... 10 2021 005 533.0

(51) Int. Cl.
*B60L 15/00* (2006.01)

(52) U.S. Cl.
CPC ......... *B60L 15/007* (2013.01); *B60L 2210/10* (2013.01); *B60L 2210/30* (2013.01)

(58) Field of Classification Search
CPC . B60L 15/007; B60L 2210/10; B60L 2210/30
See application file for complete search history.

(56) References Cited

U.S. PATENT DOCUMENTS 9,345,160 B2 * 5/2016 Fukumasu ............. B60L 58/20
2004/0257841 A1 12/2004 Taguchi et al.
(Continued)

FOREIGN PATENT DOCUMENTS

DE   10 2018 002 926 A1   9/2018
DE   10 2018 004 498 A1   1/2019
(Continued)

OTHER PUBLICATIONS

International Search Report (PCT/ISA/210) issued in PCT Application No. PCT/EP2022/081027 dated Jan. 9, 2023 (2 pages).
(Continued)

*Primary Examiner* — Carlos Amaya
(74) *Attorney, Agent, or Firm* — Crowell & Moring LLP

(57) ABSTRACT

A component arrangement for an electric high-voltage on-board power supply of a vehicle includes a shared EMC filter, a shared intermediate circuit, a plurality of electrical components, and a shared housing. The shared EMC filter and the shared intermediate circuit are provided for the plurality of electrical components. The plurality of electrical components are disposed in the shared housing together with the shared EMC filter and the shared intermediate circuit. The plurality of electrical components are interconnected in parallel with the shared intermediate circuit and the shared EMC filter and there is otherwise no electrical connection between them.

5 Claims, 3 Drawing Sheets

(56) References Cited

U.S. PATENT DOCUMENTS

2006/0151219 A1    7/2006   Khan et al.
2014/0239712 A1    8/2014   Yoon et al.

FOREIGN PATENT DOCUMENTS

| | | |
|---|---|---|
| DE | 10 2019 008 835 A1 | 7/2020 |
| DE | 10 2019 008 825 A1 | 6/2021 |
| DE | 10 2021 003 831 A1 | 2/2023 |
| EP | 3 623 207 A1 | 3/2020 |
| EP | 3 878 700 A1 | 9/2021 |
| JP | 2005-12908 A | 1/2005 |
| JP | 2017-112681 A | 6/2017 |
| WO | WO 2017/188268 A1 | 11/2017 |

OTHER PUBLICATIONS

Japanese-language Office Action issued in Japanese Application No. 2024-526459 dated Apr. 22, 2025 (4 pages).

\* cited by examiner

COMPONENT ARRANGEMENT FOR AN
ELECTRICAL HIGH-VOLTAGE ON-BOARD
POWER SUPPLY OF A VEHICLE

BACKGROUND AND SUMMARY OF THE INVENTION

The invention relates to a component arrangement for an electrical high-voltage on-board power supply of a vehicle.

An arrangement of at least one high-voltage battery having several storage cells that are electrically connected to one another and are designed to store electrical energy on a self-supporting body of a passenger car is known, as described in DE 10 2018 004 498 A1, from the prior art. The high-voltage battery, and further high-voltage components provided in addition to the high-voltage battery and electrically connected to the high-voltage battery, are at least indirectly held on the body. The body forms a high-voltage safety cell that can be temperature controlled by means of a temperature control device of the passenger car, the high-voltage battery and the further high-voltage components being arranged in the high-voltage safety cell.

In DE 10 2018 002 926 A1, an electrical on-board power supply for a motor vehicle is described. It comprises at least one first and one second electrical potential line, and is designed to have a direct voltage applied to it between the potential lines during normal operation. The on-board power supply has at least one Y capacitor, which is electrically coupled to a first connector with one of the potential lines and to a second connector with an electrical reference potential. A switch element is connected in series to the at least one Y capacitor.

A vehicle having an electrical high-voltage on-board power supply is known from DE 10 2019 008 825 A1. The electrical high-voltage on-board power supply is sub-divided into three subsections, wherein the first subsection is arranged in a first installation space of the vehicle, the second subsection is arranged in a second installation space of the vehicle, and the third subsection is arranged outside of these two installation spaces of the vehicle.

In DE 10 2019 008 835 A1, a vehicle having an electrical high-voltage on-board power supply is described. The electrical high-voltage on-board power supply is sub-divided into two subsections, wherein the first subsection is arranged in a first installation space of the vehicle, and the second subsection is arranged in at least one second installation space of the vehicle. The sub-division of the electrical high-voltage on-board power supply into the two subsections is designed such that, in the first installation space of the vehicle, work is only possible if electrical voltage is applied to the first subsection of the electrical high-voltage on-board power supply, and in the at least one second installation space of the vehicle, work is possible in a voltage-free state of the second subsection of the electrical high-voltage on-board power supply.

In DE 10 2021 003 831, an electrical on-board power supply for a vehicle, a vehicle having an electrical on-board power supply and a method for operating an electrical on-board power supply for a vehicle are described. The electrical on-board power supply comprises a battery having two electrical battery potential contacts, and a direct current charging connector having two electrical charging potential contacts in the vehicle. A DC/DC converter is provided. The first electrical battery potential contact is or can be electrically coupled to a first electrical potential contact of an output side of the DC/DC converter. The second electrical battery potential contact is or can be electrically coupled to the second electrical charging potential contact. The respective electrical charging potential contact is or can be electrically coupled to a respective electrical potential contact of an input side of the DC/DC converter. A second electrical potential contact of the output side of the DC/DC converter is or can be electrically coupled with the first electrical potential contact of the input side of the DC/DC converter. The electrical potential contacts of the input side of the DC/DC converter are respectively electrically coupled to one electrical connector contact of a first capacitor. The electrical potential contacts of the output side of the DC/DC converter are or can be respectively electrically coupled to one electrical connector contact of a second capacitor.

The object of the invention is to specify an improved component arrangement in relation to the prior art for an electrical on-board power supply of a vehicle.

In a component arrangement for an electrical high-voltage on-board power supply of a vehicle, according to the invention, a shared EMC filter and a shared intermediate circuit are provided for several electrical components, wherein these electrical components are arranged in a shared housing together with the shared EMC filter and the shared intermediate circuit. The abbreviation EMC means electromagnetic compatibility.

This unit, having the housing and having the electrical components, the shared EMC filter and the shared intermediate circuit, which are located in the housing, is also described as a conversion box.

The solution according to the invention makes a simplified and standardized structure of a high-voltage system of a vehicle possible, because different electrical components, for example power electronics for at least one electric drive engine for driving the vehicle, a rectifier, also described as an AC/DC converter, in particular for alternating current charging of a high-voltage battery of the vehicle, and/or a DC/DC converter, can jointly share the intermediate circuit and the shared EMC filter, whereby these parts, i.e., the intermediate circuit and the EMC filter, are then designed to be able to fulfil the function of all of these components. In this way, these components do not themselves need to have their own EMC filters and intermediate circuits and can have a smaller and more compact construction. The DC/DC converter is in particular a low-voltage direct current converter, also described as an LV DC/DC converter, in particular for converting a high-voltage electrical voltage of the high-voltage on-board power supply of the vehicle into a smaller electrical DC voltage for an electrical low-voltage on-board power supply of the vehicle.

In the solution according to the invention, all essential components of the high-voltage system for a vehicle are thus advantageously arranged in a housing, i.e., in a box, and connected to one another, so that this box can be used universally, in particular with the same structure, for different vehicles, and in particular for different vehicle types.

Exemplary embodiments of the invention are explained in more detail in the following with reference to drawings.

DETAILED DESCRIPTION OF THE DRAWINGS

Figure 1:
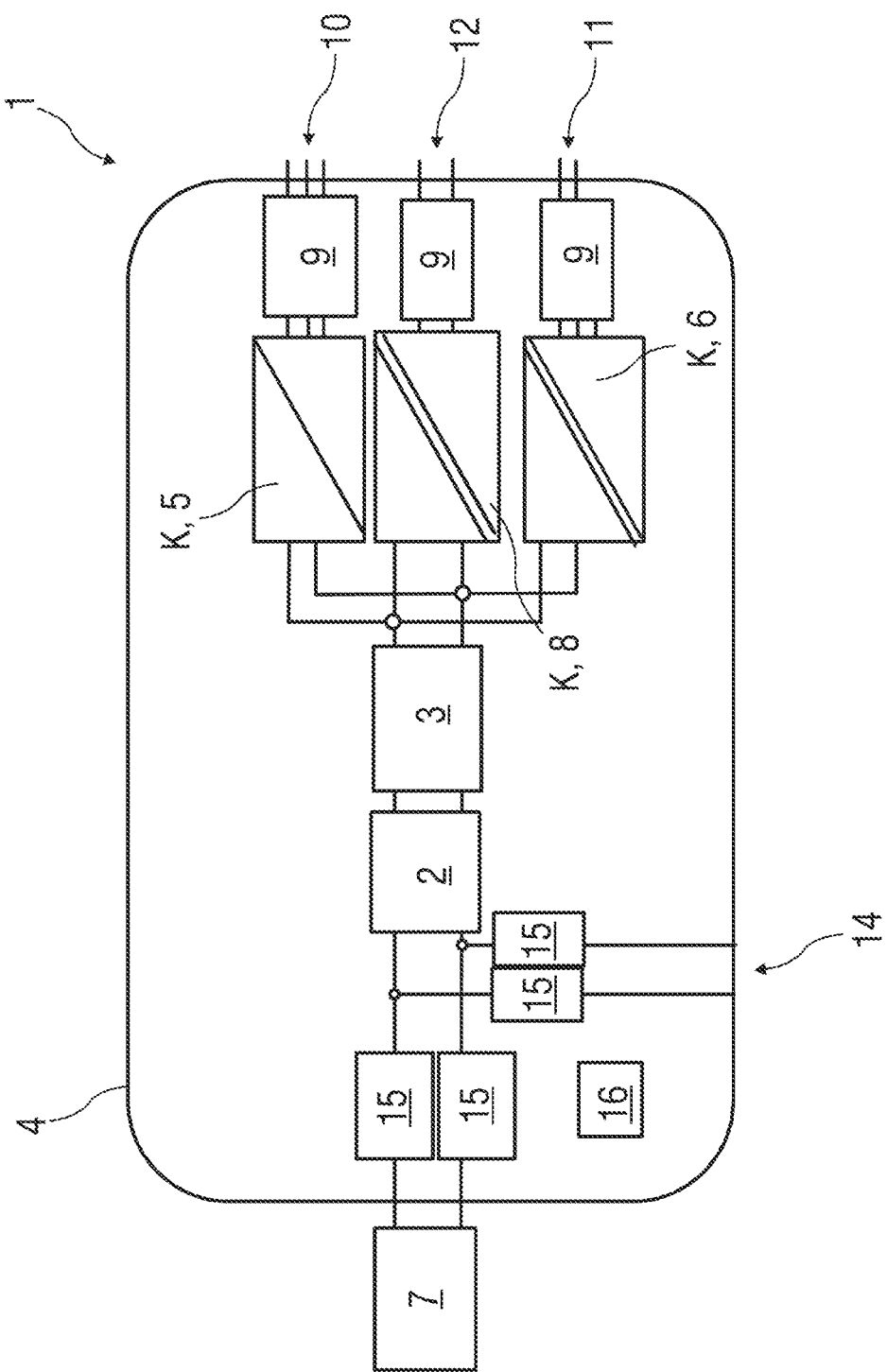
FIG. 1 schematically shows an embodiment of a component arrangement for an electrical high-voltage on-board power supply of a vehicle.

Parts corresponding to one another are provided with the same reference numerals in all figures.

Figure 2:
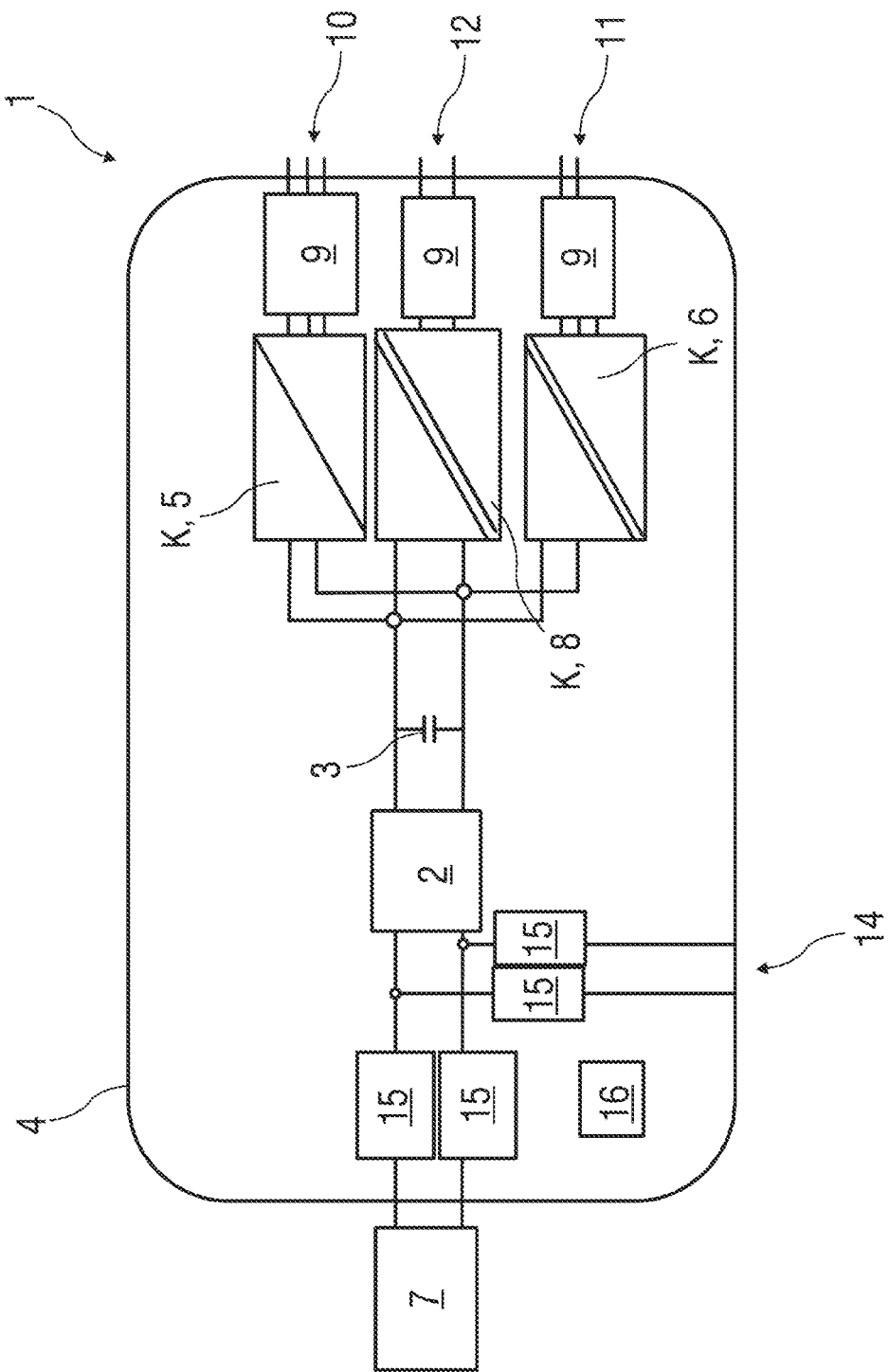
FIG. 2 schematically shows a further embodiment of a component arrangement for an electrical high-voltage on-board power supply of a vehicle.
Figure 3:
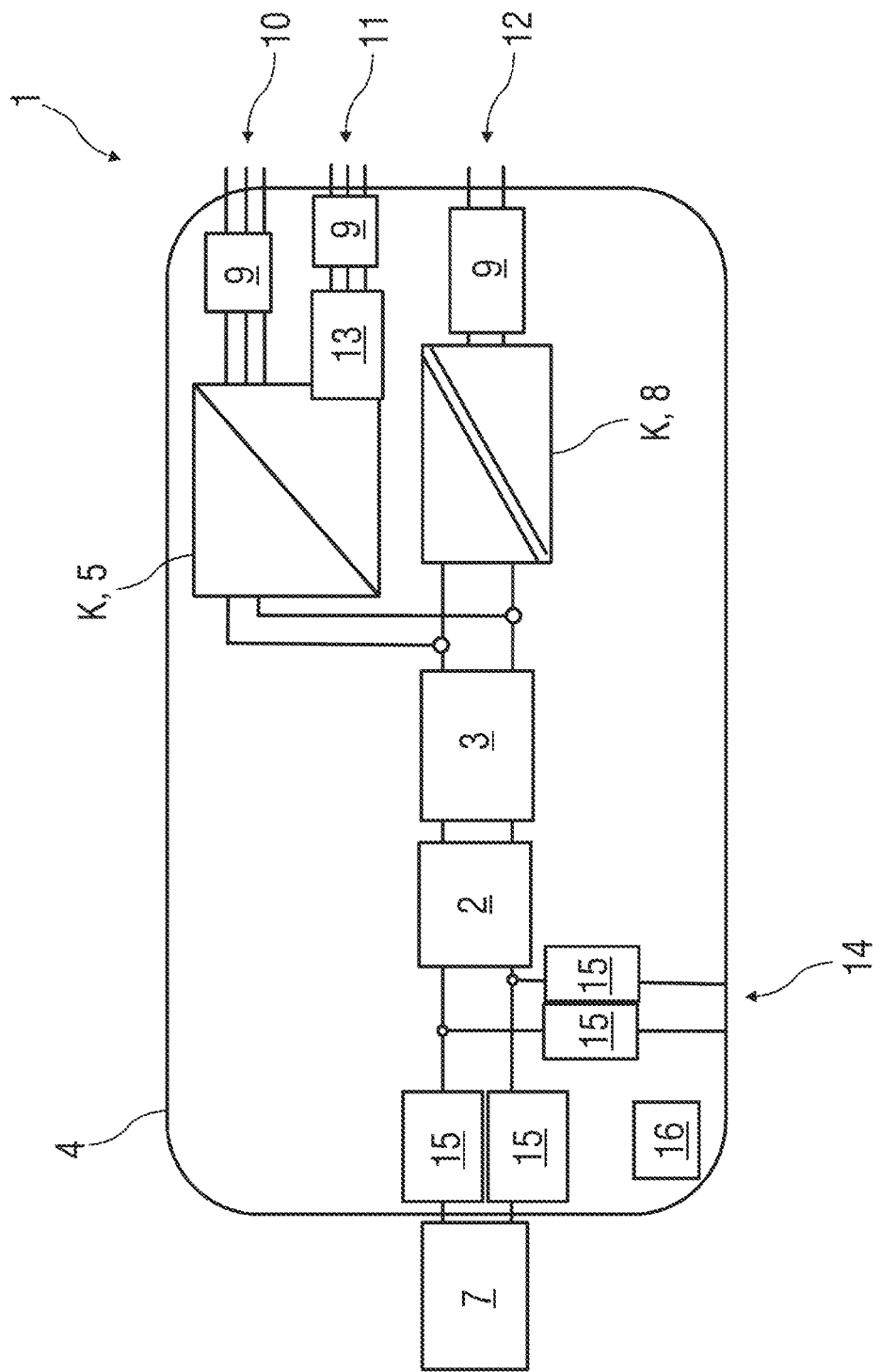
FIG. 3 schematically shows a further embodiment of a component arrangement for an electrical high-voltage on-board power supply of a vehicle.

FIGS. 1 to 3 show, in an exemplary form, three embodiments of a component arrangement 1 for an electrical high-voltage on-board power supply of a vehicle.

In all the depicted embodiments of the component arrangement 1, a shared EMC filter 2 and a shared intermediate circuit 3 are provided for several electrical components K, wherein these electrical components K are arranged in a shared housing 4 together with the shared EMC filter 2 and the shared intermediate circuit 3.

FIG. 2 shows a concretization of the embodiment depicted in FIG. 1 in relation to a possible design of the shared intermediate circuit 3 as a capacitor. The shared intermediate circuit 3 of the embodiment according to FIG. 3 can also be designed in this way.

The unit, having the housing 4 and having the electrical components K, the shared EMC filter 2 and the shared intermediate circuit 3, which are located in the housing 4, is also described as a conversion box.

The described solution makes a simplified and standardized structure of a high-voltage system of a vehicle possible, because different electrical components K can jointly share the intermediate circuit 3 and the shared EMC filter 2, whereby these parts, i.e., the intermediate circuit 3 and the shared EMC filter 2, are then designed to be able to fulfil the function of all of these components K. In this way, these components K do not themselves need to have their own EMC filters and intermediate circuits, and can have a smaller and more compact construction. In the described solution, all essential component parts of the high-voltage system for a vehicle are thus advantageously arranged in a housing 4, i.e., in a box, and connected to one another, so that this box can be used universally, in particular with the same structure, for different vehicles, and in particular for different vehicle types.

The electrical components K, for which the shared EMC filter 2 and the shared intermediate circuit 3 are provided, are for example, as shown in FIG. 1, power electronics 5 for at least one electric drive engine for driving the vehicle, a rectifier 6, also described as an AC/DC converter, in particular for alternating current charging of a high-voltage battery 7 of the vehicle, and a DC/DC converter 8. The DC/DC 8 is in particular a low-voltage DC/DC converter, also described as an LV DC/DC converter, in particular for converting a high-voltage electrical voltage of the high-voltage on-board power supply of the vehicle into a smaller electrical DC voltage for an electrical low-voltage on-board power supply of the vehicle. Preferably, the power electronics 5 for the at least one electric drive engine have a galvanic coupling, as schematically depicted in FIGS. 1 and 2 by a slash, and the rectifier 6 and the DC/DC converter 8 respectively have a galvanic isolation, as schematically depicted in FIGS. 1 and 2 by two slashes.

Optionally, it can be provided that a further EMC filter 9 is arranged at an output of the respective component K, i.e., one or more or all of the components K can each have their own further EMC filter 9 at their output. This respective further EMC filter 9 can be arranged in the shared housing 4 or outside of the shared housing 4.

In the embodiments according to FIGS. 1 and 2, the power electronics 5 for the at least one electric drive engine, the rectifier 6 and the DC/DC converter 8 respectively have one such further EMC filter 9 at their output, i.e., in the direction of a drive engine connector 10 or of an alternating current charging connector 11 or of a low-voltage on-board power supply connector 12. In the depicted example, these further EMC filters 9 are arranged in the housing 4. In other embodiments, it can for example be provided that the respective further EMC filters 9, i.e., one, two or all three further EMC filters 9, is/are arranged outside of the housing 4. For example, if they are required, they can thus additionally be provided without having to undertake changes to the unit integrated into the housing 4 for this purpose.

FIG. 3 shows a further embodiment, in which no separate component K for the rectifier 6, also described as an AC/DC converter, for alternating current charging of the high-voltage battery 7 is provided, but rather this function is also taken on by an inverter of the power electronics 5 for the at least one electric drive engine. The function of alternating current charging and the function of engine alternating inverter, also described as an inverter, are in particular implemented by a semiconductor circuit. Preferably, the power electronics 5 for the at least one electric drive engine have a galvanic coupling, as schematically depicted by a slash, and the DC/DC converter 8 has a galvanic isolation, as schematically depicted by two slashes.

In the embodiment depicted in FIG. 3, the power electronics 5 for the at least one electric drive engine, of which the inverter is additionally used for alternating current charging, and the DC/DC converter 8 respectively have one further EMC filter 9 at their output, i.e., in the direction of the drive engine connector 10 or of the alternating current charging connector 11 or of the low-voltage on-board power supply connector 12 for the at least one electric drive engine. Here too, these further EMC filters 9 are arranged in the housing 4. In other embodiments, it can for example be provided that the respective further EMC filters 9, i.e., one, two or all three further EMC filters 9, is/are arranged outside of the housing 4. For example, if they are required, they can thus additionally be provided without having to undertake changes to the unit integrated into the housing 4 for this purpose.

In the embodiment according to FIG. 3, a safety unit 13 is provided at the output of the power electronics 5 for the at least one electric drive engine in the direction of the alternating current charging connector 11 to implement the alternating current charging function, the safety unit being arranged between the power electronics 5 for the at least one electric drive engine and the further EMC filter 9 in the example shown. This safety unit 13 is used to comply with safety and EMC standards. The galvanic coupling requires additional measures, e.g., an emergency switch-off and a neutralization of PE discharge currents.

In a further embodiment not depicted here, it can for example be provided that no alternating current charging function is integrated. The components K, which share the shared intermediate circuit 3 and the shared EMC filter 2, would then be only the power electronics 5 for the at least one electric drive engine and the DC/DC converter 8, also described in particular as an LV DC/DC converter.

As described, the components K specified above share the same intermediate circuit 3 and the shared EMC filter 2 on the direct current side. They additionally have separable outputs to a direct current charging connector 14 and to the high-voltage battery 7. Isolators 15 for this purpose are, for example, respectively designed as a semiconductor fuse or contactor/CSID. A semiconductor fuse can for example respectively be provided on both poles, or a contactor/fuse combination can be provided on both poles, or a contactor/CSID can respectively be provided on both poles, or a contactor can be provided on one pole and a semiconductor fuse can be provided on the other pole.

The components K, i.e., in the embodiments according to FIGS. 1 and 2, the power electronics 5 for the at least one electric drive engine, the rectifier 6 and the DC/DC converter 8, and in the embodiment according to FIG. 3, the power electronics 5 for the at least one electric drive engine and the DC/DC converter 8, are in particular respectively designed as semiconductor components.

In addition, in all of the depicted embodiments, a microcontroller 16 is provided which is also arranged in the housing 4. This microcontroller 16 is in particular designed as a semiconductor component.

The shared intermediate circuit 3 and the shared EMC filter 2 are each designed in particular as a passive component part.

The isolators 15 are in particular designed as a passive semiconductor component, for example as a semiconductor fuse. As an alternative, the isolators 15 can for example be designed as a contactor or CSID, which is then conversely a mechanical component.

The respective further EMC filter 9, if it is provided, is in particular designed as a passive component.

The above-described component parts of the component arrangement 1, in particular of the conversion box, that are in particular arranged in the housing 4, in particular the above-described components K, are advantageously implemented together in the form of highly integrated power electronics, i.e., the component arrangement 1, in particular in the housing 4, does not have any individual component parts, but only the highly integrated performance electronics.

The described solution in particular makes it possible to compactly integrate high-voltage functionalities, for example electrical switching, charging, conversion, inversion, which then for example also makes a more compact structure and/or reduction in costs possible.

The described solution advantageously uses a shared installation space for all of the high-voltage functionalities, in particular switching, charging, conversion and inversion. Via the shared usage of passive component parts, such as the shared EMC filter 2, and the intermediate circuit capacity, i.e., the shared intermediate circuit 3, synergies are used. A compact structure is thus enabled. By replacing mechanical fuse/switch-off elements, in particular contactors, with semiconductor switches for isolating the high-voltage battery 7, mechanical component parts are not required for the function of switching. Advantageously, power electronic semiconductors are used to implement all of the core functions, in particular switching, conversion, charging, inversion. By this implementation of all of the essential functions via semiconductors, a high semiconductor integration can be achieved. An implementation of function variants and/or additional functions, for example due to special equipment, for example special equipment for alternating current charging, is advantageously implemented in the software, and not, as previously, by changing the hardware, because individual functions cannot be removed from the overall high-voltage power electronics. In addition, functions can thus also be bought and activated after vehicle production.

To be able to use the shared EMC filter 2 for all functionalities, the controls of the individual semiconductor groups are advantageously coordinated with one another.

As already mentioned, the described solution advantageously uses a shared installation space for all of the high-voltage functionalities, in particular switching, charging, conversion and inversion. In the embodiment according to FIG. 3, synergies are not only used in passive component parts, but rather, a semiconductor circuit is used for the motor control and for the alternating current charging functionality. That is, in addition to the synergies in passive component parts, the synergy is thus also used at the level of the semiconductor circuit for the motor control and for the alternating current charging functionality. By additionally also using synergies in active component parts for the converter of the drive and of the alternating current charging, a more compact structure and an actual reduction in costs is possible. The combination of the different functions, in particular the alternating current charging function and the driving function by means of the at least one electric drive engine, to form the superordinate function of energy conversion, is a consequent further development of the trend in the battery-electric vehicle sector of high integration, and takes into account the trend of semiconductor development.

Here too, functional variants, for example due to special equipment, are implemented in the software, and not, as previously, by changing the hardware, because individual functions cannot be removed from the overall high-voltage power electronics. The possibility thus also arises here, as in the other embodiments according to FIGS. 1 and 2, of using standardized high-voltage power electronics for different vehicle series, whereby significant advantages with regard to cost can be achieved.

Here too, to be able to use the shared EMC filter 2 for all functionalities, the controls of the individual semiconductor groups are advantageously coordinated with one another.

LIST OF REFERENCE CHARACTERS 1 component arrangement
2 shared EMC filter
3 intermediate circuit
4 housing
5 power electronics
6 rectifier
7 high-voltage battery
8 DC/DC converter
9 further EMC filter
10 drive engine connector
11 alternating current charging connector
12 low-voltage on-board power supply connector
13 safety unit
14 direct current charging connector
15 isolator
16 microcontroller
K component

The invention claimed is:

1. A component arrangement (1) for an electric high-voltage on-board power supply of a vehicle, comprising:
a shared electromagnetic compatibility (EMC) filter (2);
a shared intermediate circuit (3);
a plurality of electrical components (K);
wherein the shared EMC filter (2) and the shared intermediate circuit (3) are provided for the plurality of electrical components (K); and
a shared housing (4), wherein the plurality of electrical components (K) are disposed in the shared housing (4) together with the shared EMC filter (2) and the shared intermediate circuit (3);

wherein the plurality of electrical components (K) are interconnected in parallel with the shared intermediate circuit (3) and the shared EMC filter (2) and there is otherwise no electrical connection between them.

2. The component arrangement (1) according to claim 1, wherein the plurality of electrical components (K) comprise power electronics (5) for at least one electric drive engine for driving the vehicle, a rectifier (6), and/or a DC/DC converter (8).

3. The component arrangement (1) according to claim 1, further comprising a plurality of EMC filters (9) that are respectively disposed at a respective output of the plurality of electrical components (K).

4. The component arrangement (1) according to claim 3, wherein the plurality of EMC filters (9) are disposed in the shared housing (4) or outside of the shared housing (4).

5. The component arrangement (1) according to claim 1, wherein the shared intermediate circuit (3) is a capacitor.

\* \* \* \* \*